2,614,126

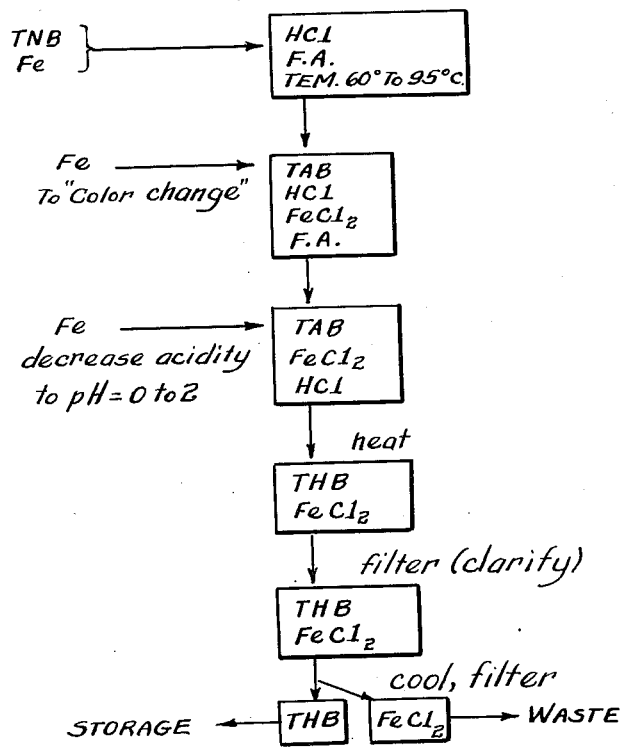
Key
TNB Symmetrical trinitrobenzene compound
TAB Symmetrical triaminobenzene compound
THB Symmetrical trihydroxybenzene compound
F.A. Not less than about 3 grams per 100 c.c.
INVENTOR.
John Krueger
BY Patented Oct. 14, 1952

UNITED STATES PATENT OFFICE 2,614,126

PREPARATION OF SYMMETRICAL TRIHYDROXYBENZENE COMPOUNDS

John Krueger, West Caldwell, N. J., assignor to The Edwal Laboratories, Inc., Ringwood, Ill., a corporation of Illinois Application February 11, 1950, Serial No. 143,828

17 Claims. (Cl. 260—621)

This invention relates to new and useful improvements in the preparation of symmetrical trihydroxybenzene compounds from symmetrical trinitrobenzene compounds by reduction with iron in strongly acid solutions to form the intermediate symmetrical triaminobenzene compounds followed by hydrolysis of the latter.

Much study, extending over a long number of years, has been given to the treatment of symmetrical trinitrobenzene compounds to convert them into corresponding hydroxy compounds, such procedures involving reductions by catalytic methods, by electrolytic methods, tin-hydrochloric acid reduction procedures, iron-acidified water reduction procedures, and the like. Despite the large amount of study and investigation in this field, the processes evolved have been expensive and cumbersome and certain symmetrical trihydroxybenzene compounds, even when prepared, have, with the exception of phloroglucinol, been regarded as laboratory curiosities.

The only symmetrical trihydroxybenzene compound which has come into commercial use has been phloroglucinol and, even when prepared by the best methods heretofore known, the cost of producing phloroglucinol has been high due to the high cost of tin and to difficulties and cumbersomeness of such methods. Probably as good as any method heretofore known for the commercial production of phloroglucinol is that described by Clarke and Hartmann at page 444 of the Collective Volume I of Organic Syntheses (1932). Their method, which is a modification of the method described in German Patent No. 102,358, comprises providing a suspension of symmetrical (2,4,6) trinitrobenzene or 2,4,6-trinitrobenzoic acid in concentrated hydrochloric acid, adding tin in small portions gradually, diluting the reaction mixture with water, adding caustic soda to neutralize all of the free acid and over "half of that combined with the tin," diluting the resulting suspension with water, and boiling the mixture under a coal gas atmosphere. The hot solution is then filtered to remove the tin oxide which is formed in the process, the precipitate is washed with water, the filtrate and washings are combined and evaporated to a substantially reduced volume, rendered acid to litmus and chilled to 0 degrees C. The crystalline phloroglucinol which separates out is filtered off and purified by several recrystallizations from water. The yield is stated to range from 46% to 53%. The authors point out, however, that when this method is applied to trinitrotoluene, not even a trace of methylphloroglucinol is formed. It is also known, from Allied Intelligence Reports, that, despite marked shortages of tin and ready availability of iron, Germany, in World War II, produced phloroglucinol by a tin process substantially like the aforementioned Clarke and Hartmann process.

These methods, and others of similar pattern, for preparing symmetrical trihydroxybenzene compounds, although possessing certain advantages over other known or suggested methods, nevertheless have serious disadvantages which are overcome by the practice of the present invention.

Relatively little has heretofore been known of the chemistry of the intermediate symmetrical triaminobenzene compounds and said compounds have never been adequately characterized. Thus, for example, symmetrical triaminobenzene base itself has been assumed by organic chemists to be non-existent (cf. Beilstein, Handbuch der organischen chemie, vol. XIII, p. 299, Edwards Brothers, Ann Arbor, Michigan). And, although other symmetrical triaminobenzene compounds such as triaminotoluene and triaminophenol have been reported in the chemical literature, they have in the past been prepared only through inconvenient and costly processes such as catalytic hydrogenation or reduction of the corresponding nitro compounds with tin and hydrochloric acid following by lengthy extraction and purification processes.

I have found that the intermediate symmetrical triaminobenzene compounds, particularly exemplified by 2,4,6-triaminobenzene, 2,4,6-triaminotoluene, and 2,4,6-triaminophenol, exhibit a chemical behavior which is materially different from that which characterizes the well known aromatic amines, for example, aniline and m-phenylene diamine.

Symmetrical triaminobenzenes are extremely reactive and sensitive to oxidizing agents and changes of acidity. I have discovered that symmetrical triaminobenzenes are relatively stable to heat and oxidizing agents, such as nitro compounds and $Fe^{+++}$, when dissolved in solutions of high acidity. In solutions of somewhat lesser acidity, they tend to hydrolyze to hydroxy compounds and at the same time become more sensitive to oxidizing agents. In solutions of still lesser acidity, the tendency towards hydrolysis decreases and the amines tend to condense and polymerize. In solutions of very weak acidity, the amines become stable to hydrolysis but more sensitive to oxidation.

In the light of the peculiar chemical behaviour of the intermediate symmetrical triaminobenzene compounds, it is understandable why previous attempts at making them through reduction of the corresponding symmetrical trinitro compounds with iron have been unsatisfactory and of no commercial value. Bielouss, U. S. Patent No. 1,492,094, disclosed reduction of trinitrotoluene with iron in water containing a very small amount of acid and claimed an 89% yield of triamino toluene. However, the alleged "triaminotoluene" or its hydrochloride was not obtained as the pure substance but that which Bielouss produced and which he asserted was triaminotoluene was described by him as a red-brown amorphous solid without definite melting point. In point of fact, triaminotoluene is a nearly white crystalline material of very definite melting point, namely, 121 degrees C. (cf. Hein and Wagner, Berichte, 68B, 856–64 (1935)).

In accordance with the present invention, symmetrical trihydroxybenzene compounds are prepared by a novel and highly useful method with marked economies in certain raw materials and operation as well as with the production of high yields of pure product. In the practice of the present invention, the method is carried out under certain conditions, hereafter described in detail, so that there are substantial savings in labor and equipment cost, and, further, the yields of the symmetrical trihydroxybenzene compounds are, in general, higher than are obtained in accordance with known proven procedures. Thus, for example, the yields of phloroglucinol may range up to about 80% or higher, and of 2-methylphloroglucinol between about 50% and about 80% when the method of the present invention is carried out.

In general, the method of my invention, which, for convenience, is illustrated in the flow diagram shown in the attached drawing, is carried out by reducing the symmetrical trinitrobenzene compounds with particles of iron and acid, keeping the acidity very high to stabilize the amino compound against oxidizing agents, namely, nitro compounds and ferric ions. When the reduction is complete and all traces of the oxidizing agents have disappeared, the acidity of solution is decreased to the range where the tendency of triaminobenzene to hydrolyze is greatest. After hydrolysis is complete, the hydroxy compounds are recovered. In my method, the acidity is not permitted to decrease to the range where polymerization occurs.

In accordance with my invention, the symmetrical trinitrobenzene compound is reacted with particles of iron and a strong non-oxidizing mineral acid. Large excesses of both iron and acid over the quantities theoretically required to reduce the symmetrical trinitrobenzene compound are used. An excess of iron is required to reduce not only the symmetrical trinitrobenzene compound but, also, to convert the ferric ion which is formed upon the reduction of the nitro groups to ferrous ion. The excess of acid is used not only to assist in the reduction of the nitro groups but, also, to enable the reduction of the ferric ion to ferrous to take place and to stabilize the intermediate symmetrical triaminobenzene compound. After all of the symmetrical trinitrobenzene compounds have been reacted, the acidity is maintained while additional quantities of iron are added to remove all remaining traces of oxidizing agents. This complete reduction of these oxidizing agents is indicated by a change in color of the reduction mixture from a brown to a green and by the change in color of the foam from a yellow to a greyish white. After the "color change," the acidity of the solution can be decreased to the range most suited for hydrolysis without a loss of symmetrical triaminobenzene compound, due to oxidation or polymerization. During the transition, the symmetrical triaminobenzene compound receives additional protection against oxidation from the large amount of dissolved ferrous salt formed by the reaction of the excess of iron and acid. During the hydrolysis of the symmetrical triaminobenzene compound to form the corresponding trihydroxy compound, the dissolved ferrous salts protect the reactants from atmospheric oxidation and, furthermore, reduce the solubility of the symmetrical trihydroxybenzene compounds sufficiently to permit recovery by precipitation or by a minimum of extractions.

Since the success of my method depends, among other things, upon the maintenance of certain ranges of acidity, it is necessary that the significance of these ranges be understood and, therefore, I set forth below the methods and units of measurement by means of which the limits of the invention may readily be ascertained and controlled.

When the acidity is outside of the range of measurement by means of a standard pH meter, I speak of the acidity as being in the "free acid" range. Since I find the use of hydrochloric acid particularly advantageous in the practice of my invention, I have defined "free acid" as meaning grams of free hydrochloric acid per 100 cc. of solution. When the range of acidity is such that it falls within the range of measurement of a pH meter, I speak of the "pH range."

The free acid is determined by measuring the quantity of 1.0 N-sodium hydroxide solution which must be added to a 25 cc. filtered aliquot of the reduction liquor to produce a permanent turbidity. This is conveniently carried out by pouring the 25 cc. sample into a large beaker, for example, one of about 700 cc. capacity, so that the sample forms a thin layer therein. A bright light is beamed against the bottom of the beaker to facilitate visual determination of the appearance of permanent turbidity. Thereupon, the 1.0 N-sodium hydroxide solution is added gradually with periodic shaking or agitation of the contents of the beaker until, finally, the precipitate no longer dissolves upon vigorous shaking and a permanent turbidity results. The amount of the sodium hydroxide used is calculated in terms of its equivalent of hydrochloric acid (or other acid as the case may be) and this is then translated into grams of acid per 100 cc. of solution.

The pH is measured with a standard pH meter (Leeds and Northrup or Coleman). Since pH meters are least accurate and reliable when measuring ranges of acidity of pH 0.0 to pH 2 (particularly when, as here, the test solutions contain large quantities of dissolved salts), the method of using the instrument and observing the measurement must be standardized. I prefer to calibrate the pH instrument with a standard solution of acid which has a pH in the range of the test solution. It is important, also, to observe and take into account any erratic movement or drift of the indicator of the pH meter.

The use of the above empirical method has permitted me accurately to measure the limits of acidity which define the behavior of the intermediate symmetrical triaminobenzene compounds. Symmetrical triaminobenzene compounds are most resistant to oxidizing agents such as ferric ions and nitro groups, do not undergo polymerization, and exhibit the least tendency towards hydrolysis when dissolved in solutions (in the case of hydrochloric acid) of acidity greater than a free acid of approximately 3. Symmetrical triaminobenzene compounds, dissolved in solutions of acidity of a free acid of approximately 3 to an approximate pH of 0.0, exhibit a slight tendency towards hydrolysis to form the corersponding trihydroxybenzene compounds and at the same time become slightly sensitive to oxidizing agents, but do not undergo polymerization. In solutions of acidity of approximately pH 0.0 to pH 2.0, the sensitivity towards oxidation and hydrolysis increases, but, again, polymerization does not take place. The maximum rate of hydrolysis appears to be in the range of pH 0.5 to pH 0.8. If symmetrical triaminobenzene compounds are heated in solutions of acidity of approximately pH of 2 to 5.5, they undergo oxidation, polymerization and condensation reactions. In solutions of weak acidity, pH 5.5 to approximately 7.0, the symmetrical triaminobenzene compounds do not hydrolyze and do not polymerize, but are extremely sensitive to mild oxidizing agents.

The method of the present invention is carried out, in general, by providing a dispersion or mixture of a strong mineral acid, for example, concentrated or commercial hydrochloric acid (Sp. Gr. 1.18) and the symmetrical trinitrobenzene compound, to which mixture particles of iron are added in small quantities and gradually over a period of time. Alternatively, the three reactants may be divided up into a number of equal or substantially equal portions and added, in order, in a reaction vessel. In still another alternative procedure, the acid and the symmetrical trinitrobenzene compound may be added to the reaction vessel and the iron particles added gradually in small amounts over a period of several hours, depending upon the quantities of the reactants utilized. For best results, care should be taken to avoid the building up of local concentration of oxidizing agents as, for example, might occur if large proportions of the symmetrical trinitrobenzene compounds are employed under conditions where the local acidity decreases to a level outside of the critical range. After the reduction reaction has occurred, which should be carried to completion or substantial completion in order to insure high yields of symmetrical trihydroxybenzene compound at the end of the process, the acidity of the mixture is adjusted in any suitable manner and the mixture or suspension is boiled for at least several hours, preferably in the presence of particles of iron, as hereinafter described, to effect hydrolysis. The sludge which is formed in the process is then filtered from the hot solution and the symmetrical trihydroxybenzene compound is recovered from the filtrate. To this end, for example, the filtrate is cooled or chilled, preferably to about 0 degrees C. to about 10 degrees C., whereupon the symmetrical trihydroxybenzene compound is practically completely precipitated so it may then be filtered off, the highly concentrated solution of ferrous chloride produced in the process serving to salt out the symmetrical trihydroxybenzene compound. It will be seen, therefore, that the evaporation or concentration steps, or ether or other solvent extraction procedures, for recovering the symmetrical trihydroxybenzene compound from the solutions in which it is produced are rendered unnecessary by the process of the present invention and may, if desired, be eliminated. Standard recovery procedures may, however, be employed if desired. The crude symmetrical trihydroxybenzene compounds obtained as described hereinabove may be purified by one or more recrystallizations from water.

In order that those skilled in the art may more fully understand the scope of the present invention, the following examples are set forth for carrying out the method generally described hereinabove. It will be understood that the examples are illustrative and are not to be considered as in any way limitative of the full scope of the invention. Thus, for example, certain changes may be made with respect to the concentrations of reacting materials, temperatures, times of treatment, limits of acidity control, and the like, which are within the spirit of the invention in the light of the guiding principles which are disclosed herein.

Example 1

150 grams of damp symmetrical trinitrobenzoic acid (55%) and 360 grams of ground iron were reacted, with stirring, with 1680 grams of concentrated hydrochloric acid. The mixture was kept at 70 degrees C. to 80 degrees C. with some stirring for 1½ to 2 hours. The temperature was then raised to 95 degrees C. for thirty minutes and then 850 cc. of water were added. The reaction mixture was then boiled under reflux for eighteen hours in a non-oxidizing atmosphere and then the sludge was filtered from the hot solution and the filtrate was chilled to 0 degrees C.

The crude phloroglucinol which precipitated out was recrystallized several times. The material so prepared was a stable, white product, practically free from ash, melting at 218 degrees C.

Example 2

150 grams of wet symmetrical trinitrobenzoic acid (86 grams of dry material) and 360 grams of ground iron were each divided into fifteen equal portions and were added under stirring at 70 degrees C.–80 degrees C. during three hours to 1400 cc. of commercial hydrochloric acid. Then 200 cc. of commercial hydrochloric acid and 50 grams of ground iron were added. The temperature was held at 70 degrees C.–80 degrees C. for one hour, then was raised to 95 degrees C. for one-half hour. The mixture was filtered hot. The filtrate showed a free acid value of 0.73 gram per 100 cc. Thereupon 850 cc. of water were added, this producing a pH of 0.6. The mixture was boiled for twenty hours, and 6 grams of iron were added at the start of boiling, again after one and one-half hours, and again after two and one-half hours. At the end of the hydrolysis, the mixture was filtered, and the crude phloroglucinol, which, on cooling the filtrate, precipitated out, was filtered off and purified by recrystallization.

Example 3

221 grams of wet symmetrical trinitrobenzoic acid (125 grams of dry material) and 360 grams of iron were each divided into sixteen equal parts and were added during four hours to a mixture made from 350 cc. of concentrated sulfuric acid and 1050 cc. of water at a temperature of 65 degrees C.–75 degrees C. The mixture was then heated to 95 degrees C. for one-half hour. The mixture was diluted with 850 cc. of water, and this produced a free acid value of 2.1 grams per 100 cc. Approximately 1300 cc. more of water were added and the solution was boiled twenty hours and then filtered from sludge. The phloroglucinol was recovered by cooling the solution, extracting with ether, and evaporating the ether.

*Example 4*

150 grams of symmetrical trinitrobenzene (containing 30% of water) were suspended in 1400 cc. of commercial hydrochloric acid, and reduced at a temperature of 75 degrees C.–82 degrees C. during four hours, by adding, with stirring, 360 grams of ground iron in fifteen equal portions. The temperature was held at 70 degrees C.–80 degrees C. for one-half hour and then was raised to 95 degrees C. and there maintained for one-half hour. The sludge was then filtered off, and 850 cc. of water were added to the filtrate. The mixture was now boiled for eighteen hours; 12 grams of iron were added during the first two hours of boiling. The hot solution was filtered from the sludge and chilled to 0 degrees C. The crude phloroglucinol which precipitated out was filtered off and purified.

*Example 5*

221 grams of wet symmetrical trinitrobenzoic acid (125 grams on dry basis) and 360 grams of iron were each divided into fourteen equal portions and were added under stirring to 1400 cc. of commercial hydrochloric acid at about 75 degrees C. during three hours. Then 100 cc. of commercial hydrochloric acid were added, which produced a free acid value of 5.3 grams per 100 cc. of solution. During the next three and one-half hours, about 100 grams of iron were added, while the mixture was held, under stirring, at 70 degrees C.–90 degrees C. Finally, 850 cc. of water were added and the mixture was boiled for sixteen hours. At the end of this time the pH was 1.3. After filtering, the solution was cooled to 0 degrees C. and the phloroglucinol which precipitated out was recovered and purified.

*Example 6*

375 grams of wet symmetrical trinitrobenzoic acid (204 grams dry) and 612 grams of ground iron were each divided into twenty-five equal portions and were added under stirring at about 75 degrees C. to a mixture of 2210 cc. of commercial hydrochloric acid and 226 cc. of water. After the first, seventh, thirteenth and nineteenth additions, 550 cc. of commercial hydrochloric acid were added. The temperature at the end of the reduction was now increased slowly to 90 degrees C. while 50 cc. of commercial hydrochloric acid and 70 grams of ground iron were added over a period of one hour. The free acid was 1.4 grams per 100 cc. Then 1300 cc. of water were added and the mixture was boiled for seventeen hours. It was filtered, the filtrate showing a pH of 1.0, and frozen out to recover the phloroglucinol.

*Example 7*

100 grams of 2,4,6-trinitroluene containing 31% moisture were suspended in 1680 grams of commercial or concentrated hydrochloric acid and were reduced to the amino compound at 70 degrees C. to 75 degrees C. during three and one-half hours by adding, with stirring, 360 grams of ground iron in 15 equal portions. After all the iron had been added, the mixture was heated at 70 degrees C. to 80 degrees C. for one hour, and then at 95 degrees C. for one-half hour. The sludge was filtered off and 850 cc. of water were then added to the filtrate. The reaction mixture was hydrolyzed by boiling for about twenty hours in an inert atmosphere and then the sludge was filtered from the hot solution and the filtrate was chilled to about 0 degrees C. The crude 2-methyl phloroglucinol which precipitated out was purified by several recrystallizations. It has been found that 2-methyl phloroglucinol is highly valuable as a dyestuff coupling agent and as a developing agent in various direct print processes.

*Example 8*

150 grams of picric acid (85%) were suspended in 1680 grams of concentrated hydrochloric acid and reduced at 70 degrees C. to 80 degrees C. during three hours by gradually adding, in 15 equal portions, 360 grams of iron. The resulting mixture was allowed to stand overnight and then was heated to 80 degrees C. and was filtered. The sludge was washed with 200 cc. of water and then 450 cc. of water were added to the combined filtrate and washings. The solution was boiled for about twenty hours and then the resulting sludge was filtered off. The filtrate was cooled, extracted with ether and the ethereal extract was treated with petroleum ether. A precipitate of gray, well-formed crystals of 1,2,3,5-tetrahydroxybenzene, melting at 160 degrees C., was produced. It has been found that 1,2,3,5-tetrahydroxybenzene is unusually satisfactory as a developer in photographic work, it being extremely rapid in its action.

*Example 9*

25 grams of trinitroanisole and 115 grams of iron were reacted with 448 cc. of concentrated hydrochloric acid at a temperature of 70 degrees C. to 80 degrees C. for about two hours. At the end of this time, 65 cc. of concentrated hydrochloric acid and 16 grams of iron were added, and the temperature was then held at 80 degrees C. for one hour, then at 95 degrees C. for one hour. The mixture was filtered hot and the filtrate showed a free acid content of 0.292 gram per 100 cc. 270 cc. of water were added which brought the value for free acid to 0.15 gram per 100 cc. The mixture was then brought to boiling and hydrolyzed a total of twenty-four hours, then filtered hot. The filtrate was extracted five times with 150 cc. portions of ether. The ether extract was dried over calcium chloride and then evaporated. The residue was recrystallized from ethyl acetate to yield 2-methoxy phloroglucinol.

*Example 10*

165 pounds of 2,4,6-trinitrotoluene in 10–12 pound portions were added alternately with 578 pounds of ground iron in 17 pound portions to 215 gallons of commercial hydrochloric acid (containing about 30% hydrogen chloride) during eight hours, at 65 degrees C. to 80 degrees C. Thus, during the first four hour period, all of the 2,4,6-trinitrotoluene and half the iron were added, while, during the second four hour period, the remainder of the iron was added. After the twenty-fourth addition of iron, the free acid of the solution was 9 grams per 100 cc., and 20 gallons more of commercial hydrochloric acid were thereupon added. After the thirty-third addition of iron had been made, the free acid was 3.65 grams per 100 cc. The mixture was heated by steam in the jacket of the kettle to 95 degrees C. for about one hour, then 165 gallons of water were added and the mixture was boiled for several hours, then held at about 100 degrees C. overnight. 3 gallons of commercial hydrochloric acid were then added. The mixture was boiled for six hours, during which the volume decreased from about 400 gallons to 300 gallons. The unreacted iron and the small quantity of iron oxide which formed were filtered off, and 200 pounds of common salt were added to the filtrate and the latter then was chilled to 0 degrees C. The crude methylphloroglucinol which was filtered off was treated with 3 pounds of activated carbon, and hot water was added until the volume was 50 gallons. The carbon was filtered off and the filtrate was chilled to 0 degrees C. The methylphloroglucinol which precipitated was collected by means of a centrifuge. The methylphloroglucinol still in solution is recoverable by solvent extraction, or, preferably, the mother liquors may be recycled.

*Example 11*

125 grams of 2,4,6-trinitrotoluene containing 12.5 grams of water were suspended in 1400 cc. of commercial hydrochloric acid, and to the stirred suspension were added, at 70 degrees C.–80 degrees C., during three hours, 360 grams of ground iron in 13 equal portions. Then 200 cc. of commercial hydrochloric acid and 16 grams of ground iron were added, and the mixture was heated to 95 degrees C. during half an hour, after which 34 grams of ground iron were added. During two hours at 90 degrees C., a further 70 grams of iron were added, until finally the free acid value was 1.46 grams per 100 cc. The sludge was filtered off and was washed with 850 cc. of warm water. The volume of the filtrate was 2200 cc. The filtrate was hydrolyzed by boiling for nine hours; 6 grams of iron were added at the start and another 6 grams after two hours' boiling. The hydrolyzed solution, when cool, was treated with 300 cc. of hydrochloric acid, which caused precipitation of methylphloroglucinol.

*Example 12*

A 2 liter round bottomed flask equipped with a drop funnel, stirrer and reflux condenser setup so that the flask may be heated and cooled as desired is charged with 325 cc. of hydrochloric acid (21 Baumé) and 250 cc. of water. The reactants, 2815 cc. of hydrochloric acid (21 Baumé), 2,4,6-trinitrobenzoic acid (270 grams, 100%) and ground iron (690 grams), are each divided into twenty-four equal portions. One portion of each reactant is added (hydrochloric acid being the first) at ten minute intervals during which time the temperature is maintained by cooling or heating, as required, at 80 degrees C. to 90 degrees C. The free acid of the reduction mixture is measured frequently to insure that the reaction is maintained within the range of 3 to 3.5 grams of acid per 100 cc. If necessary, depending upon such factors as the purity of the 2,4,6-trinitrobenzoic acid, the reaction temperature (which affects the amount of evaporation of the hydrochloric acid), and the purity and reactivity of the iron, additional amounts of hydrochloric acid may be added to keep the acidity from falling below a free acid of 3.

After all the 2,4,6-trinitrobenzoic acid has been added, additional quantities of iron are added in 10 gram portions and at intervals of five minutes in order to induce the color change. During this step, also, the acidity is maintained at a free acid of 3 grams per 100 cc. or above. Also, during this period, the reaction temperature may be raised to about 85 degrees C.–90 degrees C. without deleterious effect.

When the color change occurs, as evidenced by the change in color of the reduction mixture from a brownish cast to a green and by the change in color of the foam from a yellow to a grayish-white, the acidity is further reduced to approximate a free acid of 1 gram per 100 cc. and then filtered or decanted from the unreacted iron and iron sludge. After the filtrate and washings of the iron sludge are combined, the acidity of the resulting solution is adjusted to the pH range most suitable for hydrolysis, for example, pH 0 to 2, preferably a pH of about 0.5, by the gradual addition of a dilute (4%) solution of sodium or potassium hydroxide. After the adjustment of the pH is complete, the reaction liquors are heated under reflux for from 4 to 8 hours at the boiling point, time approximately one hour under a pressure of 2 to 3 atmospheres at 130–140 degrees C. Upon completion of the hydrolysis, the mixture is filtered and the filtrate cooled to from 5–10 degrees C. and the phloroglucinol recovered on a filter. As a precaution against excessive contamination of the symmetrical trihydroxybenzene compound by ferrous chloride, the specific gravity of the hydrolysis solution may, if desired, be adjusted by the addition of water to be not greater than 1.38–1.39 at 60 degrees C. From 140 to 150 grams of phloroglucinol (85–95% of theory) are recovered.

*Example 13*

150 grams of damp picric acid (containing 10% water) was suspended in 1600 grams of concentrated hydrochloric acid and reduced at 70–80 degrees C. over a period of four hours by the gradual addition of 360 grams of iron in fifteen equal portions. Since the free acid was 3.1 grams per 100 cc., the mixture was permitted to stand overnight. The next morning, the reduction solution was heated to 80–90 degrees C. Then 200 cc. of hydrochloric acid were added and the mixture treated with iron in small portions until the color changed. After the change in color, the reaction mixture was diluted with 400 cc. of water, filtered and adjusted to a pH of 1 for hydrolysis. After the resulting solution was boiled for twenty hours, it was filtered, cooled and extracted with ether. Upon the addition of petroleum ether to the ethyl ether extract, a precipitate of gray, well-formed crystals of 1,2,3,5-tetrahydroxybenzene melting at 160–160.5 degrees C. was produced.

The symmetrical trihydroxybenzene compounds which may be produced in accordance with the present invention may be represented by the formula

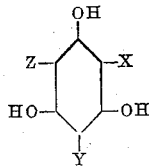

where X, Y and Z are hydrogen; alkyl such as methyl, ethyl, propyl, butyl, and the like; alkylol such as methylol, ethylol and the like; aralkyl such as benzyl, aryl such as phenyl and naphthyl; cycloalkyl such as cyclohexyl; oxy-alkyl such as oxy-ethyl; oxy-aryl such as oxy-phenyl, and the like. In general, X, Y and Z may comprise any radicals or groups which are inert or undergo no change in the process. It will, of course, be understood that X, Y and Z may be the same or dissimilar. Illustrative examples of symmetrical trihydroxybenzene compounds which may be made in accordance with my invention, in addition to those set forth in the specific examples set forth hereinabove, include 2-hexyl phloroglucinol; 2-propyl phloroglucinol; 2-isopropyl phloroglucinol; 2-butyl phloroglucinol; 2-cyclohexyl phloroglucinol; 2,4,6-trimethyl phloroglucinol; phenylethylene phloroglucinol; 2,6-dimethyl phloroglucinol; hexahydroxybenzene, and the like. The invention is of especial importance in connection with the production of phloroglucinol and 2-methyl phloroglucinol.

In the light of the foregoing description and specific illustrative examples, it will be seen that the proportions of the symmetrical trinitrobenzene compound, iron and hydrochloric acid or other strong mineral acid are so balanced and the reduction reaction is so carried out that a very considerable excess of acid is always present, at the start of the reduction reaction, as the reduction reaction proceeds, and at the end thereof, to stabilize the intermediate symmetrical triaminobenzene compound. Additional quantities of iron and, sometimes, acid are used to bring about the color change, which indicates the disappearance of oxidizing agents in the reduction mixture which tend to destroy the sensitive intermediate symmetrical triaminobenzene compounds when not protected by a high degree of acidity. In addition to the amounts of iron and acid required for the reduction, I use a sufficient excess of each at least to convert the reacted iron to the ferrous state. In other words, for each mol of symmetrical trinitrobenzene compound, an amount of iron and acid is used, in the reduction reaction, substantially in excess of the amounts required to reduce the symmetrical trinitrobenzene compound to the symmetrical triaminobenzene compound, the excess and concentration and/or amount of the acid, particularly hydrochloric acid, being such as to convert at least the major portion and usually at least 75% of the reacted iron to ferrous chloride (where hydrochloric acid is used). I find it particularly advantageous to use at least one and one-fourth, and, better still, at least one and one-half to two and one-half times the amount of iron, and at least twice and preferably two to three times the amount of the acid theoretically required to reduce the symmetrical trinitrobenzene compound to the symmetrical triaminobenzene compound. On a molal basis, for each mol of symmetrical trinitrobenzene compound, I prefer to use, in the reduction reaction, from 30 to 60 mols of hydrochloric acid and from 10 to 22 mols of iron. The optimum quantities in any given case will depend upon the purity of the iron, the specific symmetrical trinitrobenzene compound, and the exact reaction conditions. Generally speaking, of the total amount of iron used, from about 5% to about 15% remains unreacted and, in addition, from about 5% to about 20% is converted into a substance which appears to be black iron oxide, these figures depending upon the specific reactants, proportions thereof and conditions selected. It will be seen, therefore, that of the amount of iron utilized, over 50%, generally speaking, is converted into ferrous salt, for example, ferrous chloride.

The utilization of strong acid solutions at the beginning of the reduction reaction is highly advantageous since it enables higher production per unit volume of reaction solution, making the process most economical. In other words, the higher the concentration of the acid used, the more iron and symmetrical trinitrobenzene compound may be processed in a given volume of reaction liquor. Where hydrochloric acid is utilized, I prefer to utilize from about 28% to 37% strength acid, excellent results being obtained with about 30% to 35% strength hydrochloric acid. Where the acid used is relatively more dilute, for example, 20% strength hydrochloric acid, lesser amounts of symmetrical trinitrobenzene compound and iron must be used to insure that the free acid does not fall below 3 grams per 100 cc. The use of a given volume of a dilute acid (as distinguished from the use of the same volume of a concentrated acid) requires that the total quantities of symmetrical trinitrobenzene compound and iron be decreased with the result that the symmetrical trihydroxybenzene compound-producing capacity of a given unit is decreased.

After the reduction reaction, the acidity is adjusted, as is shown by the various examples set forth above. I prefer, particularly, as indicated above, to conduct the hydrolysis in the range of pH 0.5 to 0.8 although it may be carried out at somewhat lower and at somewhat higher pH values as, for example, 0.1 to 1.5. At the higher acid concentrations, for example, pH 0, the time for completion of hydrolysis is prolonged, usually being of the order of 15 to 20 hours. Moreover, hydrolysis at the higher acidities over a relatively extended period of time has the tendency of causing polymerization of the symmetrical trihydroxybenzene compounds whereby substances such as phloroglucid are formed, thereby reducing the yield of the desired symmetrical trihydroxybenzene compounds. On the other hand, if the acidity is relatively low at the start of the hydrolysis, the yield of symmetrical trihydroxybenzene compound may be decreased due to the formation of small amounts of polymeric substances from the intermediate symmetrical triaminobenzene compounds. This results from either air oxidation, or because of the fact that, during hydrolysis, the pH of the hydrolysis solution gradually increases, or from both causes.

The hydrolysis is carried out by heating under pressure or by boiling the reaction mixture at atmospheric pressure, as shown by the various examples hereinabove, for a sufficient length of time to complete the conversion to the symmetrical trihydroxybenzene compound. In general, when operating under atmospheric pressures, a boiling period of several hours, for example, from four to ten or twenty hours is satisfactory although, of course, this is subject to variation depending upon the particular compounds being treated, the exact results desired, and other factors which will be apparent to those skilled in the art in the light of the teachings herein. In general, the temperature of boiling will be somewhere around 110 degrees C. due to the large quantity of dissolved ferrous salts, for example, ferrous chloride, present in the boiling solution or suspension.

It will be seen from the description and several of the examples given hereinabove that it is preferred that the hydrolysis step be conducted under reflux although it is not necessary to do so. The heating or boiling may be carried out under pressure or in an open reaction vessel and, in this latter connection, it should be understood that loss of water by evaporation is only relatively very slight. In other words, the volume of the boiling solution or suspension is maintained substantially constant and, in certain cases, it is preferred to replenish even the small evaporation losses which occur where a reflux is not utilized by the addition of water. In this connection, a sharp distinction should be noted between this aspect of the procedure in the present invention and those practices of the prior art, for example, as described by Clarke and Hartmann, supra, where substantial evaporation of the boiling solution is carried out in order to obtain a materially reduced volume of solution prior to crystalizing the symmetrical trihydroxybenzene compound therefrom. In the practice of the present invention, as pointed out clearly hereinabove, the high concentration of ferrous chloride, which is generally of the order of about a 28% to 32% solution of ferrous chloride, where hydrochloric acid is used in the process, may be utilized to effect salting of the symmetrical trihydroxybenzene compound and the necessity for substantial evaporation prior to crystallization of the said compound is obviated. The heating or boiling step in the process of the present invention is utilized for the purpose of carrying out the desired hydrolysis reaction, not for the purpose of effecting evaporation of water from the solution or suspension. If desired, however, as illustrated in several of the examples, the symmetrical trihydroxybenzene compound may be recovered from the reaction mixture by solvent extraction procedures or the like.

It will be noted that, in several of the examples described above, I have disclosed the addition of iron during the hydrolysis step. Its use is advantageous in certain cases since, among other things, it serves to control the degree of acidity of the hydrolysis reaction mixture so as to bring it within the optimum range for carrying out the hydrolysis. Where iron is used in the hydrolysis step, it should, for best results, be added at intervals during a part of the hydrolysis reaction, as illustratively shown by the above examples.

It will be understood, as indicated hereinabove, that the process is susceptible of certain changes without departing from the spirit and essential teachings disclosed. The reaction, or major portion of the reaction, among the symmetrical trinitrobenzene compound, the strong mineral acid and the iron is preferably carried out at a temperature between about 60 degrees C. and about 90 degrees C. At temperatures appreciably below 60 degrees C., the reaction is relatively slow. At temperatures appreciably in excess of 85 degrees C. in the beginning stages of the reduction reaction, where hydrochloric acid is used, a part of said acid is volatilized and lost from the solution. I prefer to operate in the range of about 75 degrees C. to about 85 degrees C. After the main portion of the reduction reaction has been carried out, however, the temperature may be, and preferably is, raised, for example, to about 92–95 degrees C., for a short period of time to ensure completion of the reaction without any deleterious effects.

The iron is used preferably in the form of small particles. Iron turnings or iron wire is satisfactory but it is preferred to use ground iron of relatively small particle size. The symmetrical trinitrobenzene compounds are preferably handled in a damp condition to minimize the possibility of explosions occurring.

While hydrochloric acid is especially satisfactory for use in the practice of my invention, other stable acids, preferably mineral acids, may be utilized provided that they are not strongly oxidizing and provided, also, that they will produce the necessary hydrogen ion concentration. Typical examples of such acids are sulfuric acid and hydrobromic acid. In the case of sulfuric acid, since ferrous sulfate is formed in the reaction and, since ferrous sulfate is less soluble than ferrous chloride, it may be necessary that the volumes of the reaction liquors be increased in order to prevent precipitation of ferrous sulfate. This, however, is no serious objection if the symmetrical trihydroxybenzene compound is to be recovered by solvent extraction procedures as distinguished from precipitation or salting out procedures. It will also be understood that, where acids other than hydrochloric acid are utilized, there may also be slight variations in the optimum conditions of acidity. These, however, will be apparent to those versed in the art in the light of my teachings which are set forth herein.

While the invention has been described in detail, it is to be understood that the scope thereof is not to be limited other than is set forth in the claims.

This application is a continuation-in-part of my prior applications Serial Nos. 694,426 and 694,427, both filed August 31, 1946, each now abandoned and said latter applications are, in turn continuations-in-part of my prior applications Serial Nos. 450,215; 450,216; 450,217 and 450,218, all filed in July 8, 1942, each now abandoned.

What I claim as new and desire to protect by Letters Patent of the United States is:

1. In a method of preparing symmetrical trihydroxybenzene compounds, the steps which comprise adding particles of iron gradually to a mixture of an at least 28% aqueous solution of a strong mineral acid which is non-oxidizing under the conditions of the reaction and a symmetrical trinitrobenzene compound, heating the mixture for at least an hour at a temperature of about 60 degrees C. to about 95 degrees C., said reactants being present in molal proportions of from 10 to 22 mols of iron and from 30 to 60 mols of said mineral acid for each mol of symmetrical trinitrobenzene compound, said reaction serving to reduce the trinitrobenzene compound and convert the major part of the reacted iron to the ferrous salt of said mineral acid which remains in solution, the proportions of the aforesaid reactants being such that the free acid in the reaction mixture is maintained at not less than about 3 grams per 100 cc. until reduction is essentially completed, then adjusting the acidity to a pH in the range of 0.0 to 2, heating to hydrolyze the reduction product, and recovering the symmetrical trihydroxybenzene compound from the hydrolysate.

2. In a method of preparing symmetrical trihydroxybenzene compounds, the steps which comprise reacting a mixture of particles of iron, 28%–37% strength aqueous hydrochloric acid, and a symmetrical trinitrobenzene compound, heating the mixture at a temperature of about 70 degrees C. to about 90 degrees C., said reactants being present in molal proportions of from 10 to 22 mols of iron and from 30 to 60 mols of hydrochloric acid for each mol of symmetrical trinitrobenzene compound, said reaction serving to reduce the trinitrobenzene compound and convert the major part of the reacted iron to ferrous chloride which remains in solution, the proportions of the aforesaid reactants being such that the free acid in the reaction mixture is maintained at not less than about 3 grams per 100 cc. until reduction is essentially completed, then adjusting the acidity to a pH in the range of 0.0 to 2, heating to hydrolyze the reduction product, and recovering the symmetrical trihydroxybenzene compound from the hydrolysate.

3. In a method of preparing symmetrical trihydroxybenzene compounds, the steps which comprise adding particles of iron gradually to a mixture of 28%-37% strength aqueous hydrochloric acid and a symmetrical trinitrobenzene compound, heating the mixture for at least an hour at a temperature of about 60 degrees C. to about 95 degrees C., said reactants being present in molal proportions of from 10 to 22 mols of iron and from 30 to 60 mols of hydrochloric acid for each mol of symmetrical trinitrobenzene compound, said reaction serving to reduce the trinitrobenzene compound and convert the major part of the reacted iron to ferrous chloride which remains in solution, the proportions of the aforesaid reactants being such that the free acid in the reaction mixture is maintained at not less than about 3 grams per 100 cc. until reduction is essentially completed, then adjusting the acidity to a pH in the range of about 0.5 to about 0.8, heating to hydrolyze the reduction product, and recovering the symmetrical trihydroxybenzene compound from the hydrolysate.

4. In a method of preparing phloroglucinol, the steps which comprise adding particles of iron gradually to a mixture of 28%-37% strength aqueous hydrochloric acid and at least one symmetrical trinitrobenzene compound selected from the group consisting of symmetrical trinitrobenzene and 2,4,6-trinitrobenzoic acid, heating the mixture at a temperature of about 60 degrees C. to about 95 degrees C., said reactants being present in molal proportions of from 10 to 22 mols of iron and from 30 to 60 mols of hydrochloric acid for each mol of symmetrical trinitrobenzene compound, said reaction serving to reduce the trinitrobenzene compound and convert the major part of the reacted iron to ferrous chloride which remains in solution, the proportions of the aforesaid reactants being such that the free acid in the reaction mixture is maintained at not less than about 3 grams per 100 cc. until reduction is essentially completed, then adjusting the acidity to a pH in the range of about 0.5 to 0.8, heating to hydrolyze the reduction product, and recovering the phloroglucinol from the hydrolysate.

5. In a method of preparing symmetrical trihydroxybenzene compounds, the steps which comprise addition of particles of iron to a mixture of 28-37% strength aqueous hydrochloric acid and a symmetrical trinitrobenzene compound, heating the reaction mixture at a free acid of at least 3 grams per 100 cc. at a temperature of approximately 70-95 degrees C., adding additional quantities of iron until the reduction is complete, said iron being in excess of 9 mols and said acid being in excess of 18 mols for each mol of said symmetrical trinitrobenzene compound whereby to reduce said symmetrical trinitrobenzene compound to the triaminobenzene compound and to maintain the aforesaid acidity and also to enable the reacted iron to be converted to ferrous chloride and to remain in the ferrous state, adjusting the acidity to the range pH 0.0-2, heating at the boiling point to hydrolyze the intermediate symmetrical triaminobenzene compound, and recovering the resulting symmetrical trihydroxybenzene compound from the hydrolysate.

6. In a method of preparing symmetrical trihydroxybenzene compounds, the steps which comprise addition of particles of iron to a mixture of 28-37% strength aqueous hydrochloric acid and a symmetrical trinitrobenzene compound, heating the reaction mixture at a free acid of at least 3 grams per 100 cc.. at a temperature of approximately 70-95 degrees C., adding additional quantities of iron until the reduction is complete whereupon the color of the reduction solution changes from brown to greenish, said iron being in excess of 9 mols and said acid being in excess of 18 mols for each mol of said symmetrical trinitrobenzene compound whereby to reduce said symmetrical trinitrobenzene compound to the triaminobenzene compound and to maintain the aforesaid acidity and also to enable the reacted iron to be converted to ferrous chloride and to remain in the ferrous state, adjusting the acidity to the range pH of about 0.5 to about 1, heating at the boiling point to hydrolyze the intermediate symmetrical triaminobenzene compound, and recovering the resulting symmetrical trihydroxybenzene compound from the hydrolysate solution, said hydrolysate solution containing from about 28% to about 32% ferrous chloride.

7. In a method of preparing phloroglucinol, the steps which comprise addition of particles of iron to a mixture of 28-37% strength aqueous hydrochloric acid and at least one symmetrical trinitrobenzene compound selected from the group consisting of symmetrical trinitrobenzene and 2,4,6-trinitrobenzoic acid, heating the reaction mixture at a free acid of at least 3 grams per 100 cc. at a temperature of approximately 70-95 degrees C., adding additional quantities of iron until the reduction is complete, said iron being in excess of 9 mols and said acid being in excess of 18 mols for each mol of said symmetrical trinitrobenzene compound whereby to reduce said symmetrical trinitrobenzene compound to the triaminobenzene compound and to maintain the aforesaid acidity and also to enable the reacted iron to be converted to ferrous chloride and to remain in the ferrous state, adjusting the acidity to the range pH 0.0-2, heating at the boiling point to hydrolyze the intermediate symmetrical triaminobenzene compound, and recovering the phloroglucinol from the hydrolysate.

8. In a method of preparing 2-methyl phloroglucinol, the steps which comprise addition of particles of iron to a mixture of 28-37% strength aqueous hydrochloric acid and symmetrical trinitrotoluene, heating the reaction mixture at a free acid of at least 3 grams per 100 cc. at a temperature of approximately 70-95 degrees C., adding additional quantities of iron until the reduction is complete, said iron being in excess of 9 mols and said acid being in excess of 18 mols for each mol of said symmetrical trinitrobenzene compound whereby to reduce said symmetrical trinitrobenzene compound to the triaminobenzene compound and to maintain the aforesaid acidity and also to enable the reacted iron to be converted to ferrous chloride and to remain in the ferrous state, adjusting the acidity to the range pH 0.0-2, heating at the boiling point to hydrolyze the intermediate symmetrical triaminotoluene compound, and recovering the resulting symmetrical trihydroxytoluene from the hydrolysate.

9. The method of preparing symmetrical trihydroxybenzene compounds from symmetrical trinitrobenzene compounds comprising adding finely divided iron to a suspension of the symmetrical trinitrobenzene compound in an excess of a strong mineral acid which is non-oxidizing under the conditions of the reaction, maintaining the reaction mixture at a temperature in the approximate range 70-95 degrees C. and a free acid of at least 3 grams per 100 cc. until reduction is essentially complete, said iron being in excess of 9 mols for each mol of said symmetrical trinitrobenzene compound and said acid being sufficiently in excess of the stoichiometric amount required to react with said iron to effect reduction of said symmetrical trinitrobenzene compound to the triaminobenzene compound and to maintain the aforesaid acidity, decreasing the acidity to a pH in the range 0.0 to 2.0, hydrolyzing the reduction product and recovering the symmetrical trihydroxybenzene compound from the hydrolysate.

10. The method of preparing symmetrical trihydroxybenzene compounds from symmetrical trinitrobenzene compounds comprising reacting an excess of finely divided iron with a symmetrical trinitrobenzene compound and with an excess of strong hydrochloric acid, maintaining the reaction mixture at a temperature in the approximate range 70-95 degrees C. and a free acid of at least 3 grams per 100 cc. until reduction is essentially complete, said iron being in excess of 9 mols and said acid being in excess of 18 mols for each mol of said symmetrical trinitrobenzene compound whereby to reduce said symmetrical trinitrobenzene compound to the triaminobenzene compound and to maintain the aforesaid acidity, decreasing the acidity to a pH in the range 0.0 to 2.0, hydrolyzing the reduction product and recovering the symmetrical trihydroxybenzene compound from the hydrolysate.

11. The method of preparing symmetrical trihydroxybenzene compounds from symmetrical trinitrobenzene compounds comprising adding an excess of finely divided iron to a suspension of the symmetrical trinitrobenzene compound in an excess of strong hydrochloric acid, maintaining the reaction mixture at a temperature in the approximate range 70-95 degrees C. and a free acid of at least 3 grams per 100 cc. until reduction is essentially complete, said iron being in excess of 9 mols and said acid being in excess of 18 mols for each mol of said symmetrical trinitrobenzene compound whereby to reduce said symmetrical trinitrobenzene compound to the triaminobenzene compound and to maintain the aforesaid acidity, decreasing the acidity to a pH in the range of about 0.5 to about 0.8, hydrolzing the reduction product and recovering the symmetrical trihydroxybenzene compound from the hydrolysate.

12. The method of preparing symmetrical trihydroxybenzene compounds from symmetrical trinitrobenzene compounds comprising adding an excess of finely divided iron to a suspension of the symmetrical trinitrobenzene compound in an excess of strong hydrochloric acid, maintaining the reaction mixture at a temperature in the approximate range 70-95 degrees C. and a free acid of at least 3 grams per 100 cc. until reduction is essentially complete, at least half of the quantity of iron used being converted to ferrous chloride which remains in solution, the solution containing upwards of 28% ferrous chloride, said iron being in excess of 9 mols and said acid being in excess of 18 mols for each mol of said symmetrical trinitrobenzene compound whereby to reduce said symmetrical trinitrobenzene compound to the triaminobenzene compound and to maintain the aforesaid acidity, decreasing the acidity to a pH in the range 0.0 to 2.0, hydrolyzing the reduction product and recovering the symmetrical trihydroxybenzene compound from the hydrolysate.

13. The method of claim 1, wherein the symmetrical trinitrobenzene compound is symmetrical trinitrotoluene and the symmetrical trihydroxybenzene compound produced is 2-methyl phloroglucinol.

14. The method of claim 9, wherein the symmetrical trinitrobenzene compound is symmetrical trinitrotoluene and the symmetrical trihydroxybenzene compound produced is 2-methyl phloroglucinol.

15. The method of claim 9, wherein the symmetrical trinitrobenzene compound is symmetrical trinitroanisole and the symmetrical trihydroxybenzene compound produced is 2-methoxy phloroglucinol.

16. The method of claim 9, wherein the symmetrical trinitrobenzene compound is picric acid and the symmetrical trihydroxybenzene compound produced is 1,2,3,5-tetrahydroxybenzene.

17. The method of preparing symmetrical trihydroxybenzene compounds from symmetrical trinitrobenzene compounds comprising reacting a symmetrical trinitrobenzene compound with an excess over stoichiometric proportions of both particles of iron and an aqueous solution of a strong mineral acid which is non-oxidizing under the conditions of the reaction, said reactants being present in molal proportions of at least 10 mols of iron and at least 30 mols of said mineral acid for each mol of said trinitrobenzene compound, maintaining the reaction mixture at a temperature in the approximate range 70-95 degrees C., the free acid being maintained at a level of at least 3 grams per 100 cc. until reduction is essentially complete, said reaction serving to reduce the trinitrobenzene compound and convert the major part of the reacted iron to the ferrous salt of said mineral acid which remains in said solution, then adjusting the acidity to a pH in the range of 0.0 to 2.0, heating to hydrolyze the reduction product, and recovering the symmetrical trihydroxybenzene compound from the hydrolysate.

JOHN KRUEGER.

REFERENCES CITED

The following references are of record in the file of this patent:

UNITED STATES PATENTS

| Number | Name | Date |
|---|---|---|
| 1,492,094 | Bielouss | Apr. 29, 1924 |

OTHER REFERENCES

Clarke et al., "Organic Syntheses" Collected vol. I, pages 444-445 (1932).

Clarke et al., "Organic Syntheses" Collected vol. IX, pages 74-76 (1929).

Karrer, Organic Chemistry trans. by Mei (1938 Ed.), pages 401, 402, 413, pub. by Elsevier Publishing Co., New York, 1938.